United States Patent [19]

Kubacki

[11] Patent Number: 5,220,107
[45] Date of Patent: Jun. 15, 1993

[54] PROCESS FOR THE PREPARATION OF SOLID ROCKET PROPELLANT AND OTHER SOLID EXPLOSIVES FOR THERMAL DISPOSAL OR RECLAMATION

[75] Inventor: Robert W. Kubacki, Morgan Hill, Calif.

[73] Assignee: United Technologies Corporation, Hartford, Conn.

[21] Appl. No.: 110,753

[22] Filed: Oct. 19, 1987

[51] Int. Cl.$^5$ .......................... C06B 21/00; C09K 3/00
[52] U.S. Cl. .................................... 588/203; 588/202; 149/124
[58] Field of Search ................. 149/124; 588/202, 203

[56] References Cited

U.S. PATENT DOCUMENTS

| | | | |
|---|---|---|---|
| H305 | 7/1987 | Mitchell et al. | 149/124 |
| 3,864,094 | 2/1975 | Locketz | 44/605 |
| 3,888,017 | 6/1975 | McBride | 34/5 |
| 3,892,610 | 7/1975 | Huzinec | 149/76 |
| 4,046,055 | 9/1977 | McDanolds | 86/50 |
| 4,088,517 | 5/1978 | Sukornick et al. | 149/1 |
| 4,177,227 | 12/1979 | Harvey et al. | 149/19.92 |
| 4,198,209 | 4/1980 | Frosch | 588/202 |
| 4,240,587 | 12/1980 | Letsch | 241/23 |
| 4,276,100 | 6/1981 | Colvin et al. | 149/109.6 |
| 4,340,076 | 7/1982 | Weitzen | 137/13 |
| 4,440,916 | 4/1984 | Waters et al. | 525/54.2 |
| 4,764,316 | 8/1988 | Brown et al. | 264/3.1 |
| 4,923,535 | 5/1990 | Waters et al. | 149/19.92 |

FOREIGN PATENT DOCUMENTS 0152060 8/1985 European Pat. Off. .
2134014A 1/1984 United Kingdom .

*Primary Examiner*—Edward A. Miller

[57] ABSTRACT

A method of thermally disposing a binder containing explosive that reduces the possibility of an unplanned detonation and also allows for the control of pollution. It is particularly adapted for solid rocket propellants. The method comprises cooling a binder containing explosive to a temperature below the Tg range of the binder, reducing the cooled explosive to a smaller size and burning the resultant explosive. Another aspect of this invention is directed to a method for reclaiming ammonium perchlorate from an explosive comprising ammonium perchlorate and a binder that reduces the possibility of an unplanned detonation. It is particularly adapted for solid rocket propellants. The method comprises cooling the explosive to a temperature below the Tg range of the binder, reducing the cooled explosive to a smaller size and chemically extracting the ammonium perchlorate.

10 Claims, No Drawings

PROCESS FOR THE PREPARATION OF SOLID ROCKET PROPELLANT AND OTHER SOLID EXPLOSIVES FOR THERMAL DISPOSAL OR RECLAMATION

TECHNICAL FIELD

The field of art to which this invention pertains is a method of disposing of solid rocket propellant.

BACKGROUND ART

Scrap propellant is generated in random size particles as a result of cleaning out unwanted rocket motors, ordinance or other large, precut containers. Particle sizes generated typically range from a fraction of one pound to as much as several hundred pounds.

Disposal of unspent solid rocket propellant is a significant problem for the rocket manufacturing industry. The safety and environmental problems presented by such disposal are immense and at times are at odds with each other. For example, open pit burning is a conventional way of disposing of large quantities of unspent propellant in a relatively safe manner. However, this can cause significant pollution problems. Another method of disposal of unspent propellant is a batch process in which buckets are loaded with propellant and transferred to an incinerator where they are burned. This method does provide for pollution control at the incinerator; however, explosions have resulted. A third method of disposal that has been attempted is chemical reclamation.

Typically, these methods require preliminary cutting and/or grinding of the propellant in order to reduce particle size to manageable or controllable sizes, and this can result in explosions.

Accordingly, there is a constant search in this field of art for methods of disposing solid rocket propellant and ordinance in a controllable and environmentally sound manner.

DISCLOSURE OF INVENTION

This invention is directed to a method of thermally disposing of a binder containing explosive that reduces the possibility of an unplanned detonation and also allows for the control of pollution. It is particularly adapted for solid rocket propellants. The method comprises cooling a binder containing explosive to a temperature below the Tg range of the binder, reducing the cooled explosive to a smaller size and burning the resultant explosive.

Another aspect of this invention is directed to a method for reclaiming ammonium perchlorate from an explosive comprising ammonium perchlorate and a binder that reduces the possibility of an unplanned detonation. It is particularly adapted for solid rocket propellants. The method comprises cooling the explosive to a temperature below the Tg range of the binder, reducing the cooled explosive to a smaller size and chemically extracting the ammonium perchlorate.

These processes make a significant advance in the field of solid rocket propellants. By providing methods for the disposal or reclamation of unspent rocket fuel, a variety of safety and environmental problems are obviated.

The foregoing and other objects, features and advantages of the present invention will become apparent from the specification and claims which will illustrate an embodiment of the invention.

BEST MODE FOR CARRYING OUT THE INVENTION

Typically, any explosive (e.g., propellant) comprising a binder may be disposed of or reclaimed with the methods of this invention. Typically, propellants comprise fuel, binder (this also acts as a fuel), oxidizer, and a variety of additives. For example, aluminum, boron or beryllium are typical stabilizing fuels. Ammonium perchlorate, ammonium nitrate and potassium perchlorate are typical oxidizers. There are a variety of polymeric binders such as polybutadiene, polyesters, butadiene terpolymer and carboxyl terminated polybutadiene. Finally, additives such as iron oxide are used as burning accelerators and zirconium oxide is used to stabilize combustion. Explosives typically contain higher percentages of purely explosive compounds, such as nitroglycerine or cyclotetramethylenetetranitramine (HMX) than propellants.

Critical to this invention is the presence of the binder. Typically binders are added to propellants and in some cases, explosives to stabilize the mixture, assure uniformity of the mixture and provide safety in handling, transporation and storage. Polymeric binders provide considerable tensile and compressive strength to the explosive mixture. Thus, any effort to reduce the particle size of explosives or propellants requires enough energy to overcome the compressive and tensile strength of the polymeric binder. Unfortunately, any effort to reduce the particle size for disposal or reclamation may require too much energy resulting in an unplanned and uncontrolled conflagration or detonation. In addition, as the average particle size is reduced, surface area is greatly increased resulting in considerably greater sensitivity to shock or uncontrolled source of energy such as static electricity. The process described below reduces the amount of energy required to overcome the polymeric binder tensile and compressive strength, reducing the probability of an unplanned conflagration or detonation during particle size reduction.

The particle size that the propellant is reduced to depends upon whether the propellant is to be disposed of or reclaimed. If the propellant is to reclaimed (e.g., ammonium perchlorate is to be reclaimed), a particle size small enough that chemical extraction techniques can extract the desired propellant component is required. Generally, the particles should be about 20 to about 50 microns in size. For example, for a aluminum-ammonium perchlorate-polybutadiene based propellant, a particle size less than about 100 microns is sufficient. Above about 100 microns, the polybutadiene binder will inhibit the solvation of the ammonium perchlorate by an aqueous extraction technique.

In contrast, for disposal purposes, a particle size of less than about 2.5 centimeters in diameter is preferred as the small size facilitates the viability of a continuous burn disposal system. If the particles are larger, it is difficult to maintain a controlled continuous burn rate and attendant feed system. Since typical propellants burn at an average rate of about 1.25 cm per second these particle sizes result in a maximum burn time of about 2 seconds. Longer burn times may result in carry-over of very hot product gases to any scrubber system present which is undesirable because conventional scrubber systems cannot withstand the temperature of burning propellant.

According to the disposal process of this invention, the unspent propellant particles are disposed of in thermal relationship to a medium capable of lowering the particles' temperature to a temperature below the glass transition temperature range Tg range of the polymer(s) used as a binder. By Tg is meant that temperature range where the mechanical properties change as the polymer changes from a glassy brittle solid to a soft, rubbery material. Classically, Tg refers to the point where two graphed lines of temperature vs. mechanical strength for the material in its brittle and soft, rubbery state cross. In reality, this does not occur at a point but over a range which is here referred to as the Tg range.

As the polymer is cooled to a temperature below its Tg range, the polymer becomes more glassy and brittle. This causes a reduction in the amount of work required to break the polymer into smaller pieces because the forces of attraction between the polymer chain is lessened. For explosives (e.g., propellants) this results in less energy being required to reduce the particle size of the explosive and thus a lesser probability of an unplanned detonation during particle size reduction. Exemplary temperatures are about $-79°$ C. to about $-210°$ C. as these are the pertinent temperatures for these mediums listed below.

Generally, the colder the medium, the better, as the time required to reduce the propellant particle's temperature is shortened and ultimately the lower the propellant particle temperature, the less chance of an unplanned detonation during particle size reduction. Any medium that is capable of lowering the temperature of the propellant particles to the above-described temperature may be used. For example, liquid nitrogen, liquid oxygen, liquid nitrous oxide or dry ice are readily available materials. It is preferred to immerse the particles in liquid nitrogen as it has a sufficiently low temperature, is readily available and is inert to the propellants. The particles may be exposed to the medium by a variety of methods. For example, the particles may be spray-coated or immersed in the medium.

The cryogenically treated particles must be maintained at a low temperature up to and through the particle size reduction process. The risk of an uncontrolled ignition is directly proportional to any increase in temperature. Moisture can react explosively with aluminum, a typical propellant fuel. However, since an absence of humidity due to the cryogenic temperatures typically results with the presence of static electricity, it is preferred to ground any crushing apparatus.

The particle size reduction process may be accomplished by a variety of procedures. For example, a crusher may be used as a single pass device to crush several pieces as far as possible. Alternatively a series of crushing actions sequentially reducing the average particle size to that which is desired may be used. It is preferred that a low energy crusher is used such as a crusher, roller or a vertical press. High speed grinding processes add undesired energy to the system and may result in an uncontrolled ignition.

Subsequent to size reduction, the particles may optionally be placed in a desensitizing medium for storage, transport, and ultimate destruction or reclamation. The particles are allowed to warm prior to placement in the desensitizing medium since the medium (e.g. kerosene) would freeze at these temperatures. For example, the particles are allowed to warm to temperatures up to what the explosive was prior to cryogenic treatment (e.g., room temperature). A suitable desensitizing medium has high viscosity and a low evaporation rate so that all the propellant particles are coated thus greatly reducing or eliminating the generation of static electricity. Any static electricity present may result in an uncontrolled detonation. In addition, the high viscosity of the medium aids in absorbing shock between small particles thus greatly reducing or eliminating the possibility of ignition due to shock. A suitable medium is glycerin, oil or kerosene; however, kerosene is preferred because it will provide additional value for thermal destruction especially if the process allows for heat recovery for power generation. For disposal applications, a kerosene medium facilitates the eventual burning disposal process.

The propellant can then be burned by a continuous process that displaces cryogenic crushed material, preferably disposed in a desensitizing medium, into a conventional incinerator where it is burned and the resultant gases cleansed of pollutants in for example a scrubber system. This process provides for safe continual propellant disposal in a contained system where pollution can be controlled.

Alternatively, subsequent to the particle size reduction of the propellant, various propellant/explosive components may be reclaimed by a variety of conventional chemical extraction processes.

These processes provide a significant advance to the field of rocket propellants. By providing methods for the disposal or reclamation of unspent rocket fuel, a variety of safety and environmental problems are obviated. Specifically, this invention provides a process for the safe disposal of unspent rocket fuel by a method whereby pollution may be controlled.

It should be understood that the invention is not limited to the particular embodiment shown and described herein, but that various changes and modifications may be made without departing from the spirit or scope of this concept as defined by the following claims.

I claim:

1. A method of thermally disposing a binder containing explosive comprising:
    a) cooling the explosive to a temperature below the Tg range of the binder;
    b) reducing the cooled explosive to a smaller size; and
    c) burning the reduced-size explosive.

2. The method as recited in claim 1 wherein said binder containing explosive comprises a solid rocket propellant.

3. The method as recited in claim 1 wherein the explosive is cooled by disposing the explosive in thermal relationship to liquid nitrogen, liquid oxygen, liquid nitrous oxide or dry ice.

4. The method as recited in claim 1 wherein the explosive is cooled to a temperature of about $-79°$ C. to about $-210°$ C.

5. The method as recited in claim 1 wherein said cooled explosive is reduced to a particle size having at most a maximum burn rate of about 2 seconds.

6. The method as recited in claim 1 wherein said cooled explosive is reduced to a particle size less than about 2.5 centimeters in diameter.

7. The method as recited in claim 1 wherein said cooled explosive is reduced in size by crushing.

8. The method as recited in claim 1 wherein said reduced size explosive is raised to ambient temperature before burning.

9. The method as recited in claim 1 wherein said reduced size explosive is disposed in kerosene prior to burning.

10. A method for reclaiming an explosive comprising ammonium perclorate and binder comprising a) cooling the explosive to a temperature below the Tg range of the binder;
b) reducing the cooled explosive to a smaller size; and
c) chemically extracting the ammonium perchlorate.

* * * * *